United States Patent [19]

Carrock

[11] 3,883,614

[45] May 13, 1975

[54] ABS/VINYL ACETATE POLYMER BLENDS

[75] Inventor: Frederick Elias Carrock, Paramus, N.J.

[73] Assignee: Dart Industries Inc., Los Angeles, Calif.

[22] Filed: July 25, 1973

[21] Appl. No.: 382,438

[52] U.S. Cl. ............... 260/876 R; 260/4; 260/879; 260/878 R; 260/880 R
[51] Int. Cl. ...................... C08f 15/00; C08f 19/00
[58] Field of Search ...................... 260/876 R, 876

[56] References Cited
UNITED STATES PATENTS

| | | | |
|---|---|---|---|
| 3,519,701 | 7/1970 | Pilato | 260/876 R |
| 3,520,838 | 7/1970 | Burke | 260/876 R |
| 3,637,555 | 1/1972 | Marinacci | 260/876 R |
| 3,742,090 | 1/1973 | Kiuchi | 260/876 R |

FOREIGN PATENTS OR APPLICATIONS 1,926,067   3/1970   Germany

*Primary Examiner*—Paul Lieberman
*Attorney, Agent, or Firm*—Fred S. Valles; Arthur S. Collins; Margareta Lemaire

[57] ABSTRACT

A polymeric composition comprising an ABS polymer and from about 0.5 to below 50% by weight of a vinyl acetate polymer exhibits improved environmental stress crack resistance.

10 Claims, No Drawings

ABS/VINYL ACETATE POLYMER BLENDS

This invention relates to improved ABS polymers. More particularly, this invention relates to ABS/vinyl acetate polymer blends exhibiting improved environmental stress crack resistance.

ABS polymers are generally considered as being polymers derived from a monovinyl aromatic monomer, a monomeric vinyl or vinylidene compound and a rubbery material, typically represented by a polymer of acrylonitrile, a butadiene rubber and styrene. ABS compositions have found frequent use for special applications, such as molded pipe fittings for drains, waste and ventilating systems. These fittings are subjected to quite severe conditions of chemical stress resulting from the presence of waste products which are corrosive to ABS, such as acetic acid, salad oils, and other liquids. These corrosive materials can be the cause of structural failure of the ABS pipe fittings through stress cracking or crazing.

It is therefore desirable to obtain a modified ABS composition for these special applications which would exhibit high environmental stress crack resistance when exposed to these corrosive liquids. This invention provides a new polymeric composition, i.e., an improved ABS polymer composition, which possesses high environmental stress crack resistance under load and is therefore suitable for numerous special applications, such as molded pipe fittings.

The improved ABS polymeric composition for these special applications comprises a polymeric blend of an ABS polymer and from about 0.5 to below 50% by weight of a vinyl acetate polymer such as polyvinyl acetate or a copolymer of vinyl acetate.

Typical of the monovinyl aromatic compounds which can be employed in the preparation of the ABS polymers of the present invention are those wherein the vinyl group is attached directly to the carbon atom of the aromatic nucleus. Styrene is one of the preferred monovinyl aromatic compounds used in this invention. Examples of other compounds which can be used are the alkyl and/or halogen derivatives of styrene including the methylstyrenes, ethylstyrenes, isopropylstyrenes, butylstyrenes, including both the mono- and higher substituted alkyl forms, the chloro- and dichlorostyrenes, as well as the mono- and dibromostyrenes and alkyl halostyrenes, or mixtures of these compounds with styrene or with each other.

The monomeric vinyl and vinylidene compounds which can be used include acrylonitrile, methacrylonitrile, methylacrylate, methyl methacrylate, methacrylic acid, acrylic acid, vinyl chloride and mixtures thereof. It is desirable to combine monomeric vinyl or vinylidene compound with one or more of the monovinyl aromatic compounds to obtain a product with enhanced properties.

The ratio of monovinyl aromatic moiety such as styrene to vinyl or vinylidene moiety such as acrylonitrile in the ABS polymer generally ranges from about 60 to 80 parts by weight of styrene to 40 to 20 parts by weight of acrylonitrile and preferably ranges from about 74 to about 60 parts by weight of styrene to about 26 to 40 parts by weight of acrylonitrile.

The rubbery materials used in this invention include natural rubber, or synthetic rubbers, such as SBR-type rubbers, which are copolymers of styrene and butadiene having 60 to 95% by weight of butadiene and from 40 to 5% of styrene; solution-polymerized linear random or block copolymer type SBR's wherein stereospecific catalysts are used and wherein the amount of butadiene can vary from 60 to 95% by weight of the monomeric mixture and in the more preferred embodiment, from about 70 to 95 weight percent; synthetic nitrile type rubbers containing from 55 to 82% by weight of butadiene and from 45 to 18% acrylonitrile; rubbery homopolymers of butadiene and of isoprene; the rubbery copolymers of isobutylene combined with butadiene or isoprene; and rubbery terpolymers of ethylene, propylene, and a minor amount of diene monomer such as cyclopentadiene. The preferred rubbery material is a linear polybutadiene having a cis (polymerized by 1,4 addition) content of about 30 to 98 weight percent, preferably 35 to 60 weight percent. Preferably a minor amount of the rubbery material is dissolved in the polymerizable monomer in the reaction zone and polymerized in bulk to form the rubber-modified polymer.

Butadiene or isoprene polymerized by cis-1,4 addition exists in a rubbery form at ambient temperatures. The cis-1,4 form can be produced either by lithium metal or lithium alkyls or by a Ziegler type catalyst system, as is well known in the art. These methods of polymerization yield linear polymers in contradistinction to a largely nonlinear polymer obtained by well known emulsion polymerization recipes. The preferred cis-polybutadiene which can be employed in the compositions of this invention will have a viscosity between 20 to 60 as measured on the Mooney viscometer at 100°C. (ML$_4$) (ASTM-D-927-55T).

The rubbery materials used in this invention usually have a molecular weight of about 15,000 and higher. They can be incorporated in amounts from about 2 to 30% by weight based on the total weight of polymer and more preferably the rubbery components are used in amounts of about 4 to 15 weight percent. In the preparation of ABS polymers, about 3 to 10% of the rubbery component results in a medium to high impact ABS polymer, and about 10 to 15% rubber yields very high impact resins.

It has been found to be advantageous to incorporate a small amount, up to about 5 weight percent, and preferably from about 0.5 to 3.0 weight percent of a lubricant. Small amounts of such lubricants as polybutenes, hydrogenated polybutenes, paraffin wax or mineral oil, improve the processing and tensile elongation characteristics of the polymers. Other lubricants which can be used include esters or metal salts of saturated higher fatty acids.

Suitable antioxidants can also be included in the polymers in amounts from about 0.2 to 2% by weight of the total polymer and more preferably in amounts from about 0.3 to 1 weight percent. Examples of such antioxidants include trisnonylphenyl phosphite and phenolic type materials such as 2,6-di-t-butyl-4-methylphenol.

ABS compositions can be prepared by a wide variety of polymerization techniques including, for example, by bulk, solution, suspension, emulsion polymerization reactions and the like. Illustrative of the various polymerization techniques which can be employed are those disclosed in U.S. Pat Nos. 3,660,534, U.S. 3,515,692 and U.S. 3,448,175, the pertinent portions of which are incorporated herein by reference.

The vinyl acetate polymers suitable for use in the present invention include both homopolymers and copolymers of vinyl acetate. Preferably, homopolymeric polyvinyl acetate is employed. Polyvinyl acetate is a well known and commercially available polymer. If desired, copolymers of vinyl acetate with minor amounts, i.e., less than 50% by weight, of an olefin such as ethylene, propylene and the like, a vinyl monomer such as vinyl chloride, acrylonitrile, methacrylonitrile, alkyl acrylates, alkyl methacrylates, acrylic acid, methacrylic acid and the like or other copolymerizable monomers and mixtures thereof can be suitably employed.

The improved ABS composition of the present invention can be prepared by blending an ABS resin as described above with a vinyl acetate polymer wherein the concentration of vinyl acetate polymer in the resulting composition ranges from about 0.5% to below 50% by weight of total polymer. Preferably, the vinyl acetate polymer is present in the ABS composition in amounts ranging from about 5 to about 25 percent by weight. It has been found that no substantial improvement in stress crack resistance is noted when the vinyl acetate polymer is present in the ABS composition in amounts less than about 0.5% by weight. When the vinyl acetate polymer is present in the ABS composition in amounts of 50% by weight or greater, the resulting composition has been found to be too brittle to mold. The polymeric compositions of the present invention can be prepared by blending the ABS polymer with the vinyl acetate polymer in the desired amounts by conventional blending techniques such as extrusion, calendering, Banbury mixing and master batching.

The following examples illustrate the compositions of this invention and the advantages derived from the use thereof. They are included herein only for the purpose of illustration and are not to be construed as a limitation. Unless otherwise stated, all parts and percentages are by weight.

EXAMPLES 1–9

Various blends of polymeric compositions comprising ABS polymer and polyvinyl acetate were prepared and compared with the same ABS polymers containing no polyvinyl acetate (controls) with respect to stress crack resistance.

The ABS polymers employed were as follows:

Polymer A, an ABS polymer comprising styrene and acrylonitrile in a weight ratio of 72/28 and 9 parts by weight of polybutadiene. The polymer exhibits a Melt Index (230°C., 5 kg) of about 6.

Polymer B, identical in composition to Polymer A but exhibiting a Melt Index (230°C., 5 kg) of about 2.5.

Polymer C, an ABS polymer comprising styrene and acrylonitrile in a weight ratio of 75/25 and 11 parts by weight of polybutadiene. The polymer exhibits a Melt Index (230°C., 5 kg) of about 0.6.

Polymer D, an ABS polymer comprising a blend of Polymer B and Polymer C in a weight ratio of 65/35 and 1/4% by weight of carbon black.

The vinyl acetate polymers used in Examples 1–9 below were either Gelva V-800, which is a high molecular weight (1,500,000 wt. average molecular wt.) crystalline polyvinyl acetate manufactured by Monsanto Company, or Polyco 2116, which is an aqueous emulsion of high molecular weight polyvinyl acetate manufactured by the Borden Company, having a 55% solids content.

The data for the various examples are set forth in the following Table I. The term "ESCR, sec." refers to the environmental stress crack resistance value, time in seconds to failure of a cantilever beam measuring 5 by ½ by ⅛ inch at a maximum fiber stress of 2,750 psi, to which glacial acetic acid is applied.

TABLE I

| Example | EFFECT OF POLYVINYL ACETATE IN BLENDS WITH ABS ON STRESS CRACK RESISTANCE | | | | | | |
|---|---|---|---|---|---|---|---|
| | 1 | 2 | 3 | Control | 4 | 5 | Control |
| Compositions | | | | | | | |
| Polymer A | 58.5 | 63.3 | 61.7 | 0 | 0 | 0 | 0 |
| Polymer B | 0 | 0 | 0 | 65.0 | 63.3 | 61.7 | 65.0 |
| Polymer C | 31.5 | 34.2 | 33.3 | 35.0 | 34.2 | 33.3 | 35.0 |
| Polymer D | 0 | 0 | 0 | 0 | 0 | 0 | 0 |
| GELVA V-800 | 10.0 | 2.5 | 5.0 | 0 | 2.5 | 5.0 | 0 |
| POLYCO 2116 | 0 | 0 | 0 | 0 | 0 | 0 | 0 |
| BHT | 0.2 | 0.2 | 0.2 | 0.2 | 0.2 | 0.2 | 0.2 |
| Calcium Stearate | 0.5 | 0.5 | 0.5 | 0.5 | 0.5 | 0.5 | 0.5 |
| 7009 Black Conc. | 0 | 0 | 0 | 0.8 | 0.8 | 0.8 | 0.8 |
| Properties | | | | | | | |
| ESCR, sec. | | | | | | | |
| Compression molded specimen, 1 wk. after molding | — | — | — | 33 | 72 | >600 | — |
| Injection molded specimen, 1 wk. after compounding | >600[1] | >600 | >600 | 67 | 504 | >600 | 78 |
| Injection molded specimen, 4 mos. after compounding | — | — | — | 56 | 406 | >600 | — |
| Injection molded specimen, after 1 wk. in water at 140°F | — | — | — | 60 | 525 | >600 | — |
| Injection molded specimen, after 1 wk. in 1% detergent at 140°F | — | — | — | 51 | 558 | >600 | — |
| Melt index, 230°C., 5 kg | 2.0 | 2.1 | 2.8 | 1.2 | 0.9 | 1.6 | 1.4 |
| Izod impact, R.T., GE/DE, ft.-lbs./in. | 3.2/1.7 | 7.9/2.8 | 8.5/2.4 | 7.7/3.4 | 8.7/2.8 | 9.4/3.1 | 8.1/3.3 |
| Tensile yield strength, psi | 6570 | — | — | 6420 | 6490 | 6580 | 6530 |
| Tensile fail strength, psi | 5290 | — | — | 5450 | 5420 | 5460 | 5750 |
| Elongation at failure, % | 18.7 | — | — | 29.6 | 24.7 | 24.0 | 40.7 |
| Rockwell "R" hardness | 105.5 | — | — | 104.1 | 104.0 | 104.1 | 105.6 |
| Heat deflection temp., °C | 97.0 | — | — | 99.3 | 99.8 | 99.0 | 99.0 |

TABLE I – Continued

| Example | 6 | 7 | Control | 8 | 9 |
|---|---|---|---|---|---|
| Compositions | | | | | |
| Polymer A | 0 | 0 | 0 | 0 | 0 |
| Polymer B | 61.7 | 61.7 | 0 | 0 | 0 |
| Polymer C | 33.3 | 33.3 | 0 | 0 | 0 |
| Polymer D | 0 | 0 | 100 | 77.5 | 95.0 |
| Gelva V-800 | 5.0 | 0 | 0 | 2.5 | 5.0 |
| Polyco 2116 | 0 | 5.0* | 0 | 0 | 0 |
| BHT | 0.2 | 0.2 | 0 | 0 | 0 |
| Calcium Stearate | 0.5 | 0.5 | 0 | 0 | 0 |
| 7009 Black Conc. | 0.8 | 0.8 | 0 | 0 | 0 |
| Properties | | | | | |
| ESCR, sec. | | | | | |
| Compression molded specimen, 1 wk. after molding | — | — | — | — | — |
| Injection molded specimen, 1 wk. after compounding | >600 | >600 | 60 | 504 | >600 |
| Injection molded specimen, 4 mos. after compounding | — | — | — | — | — |
| Injection molded specimen, after 1 wk. in water at 140°F. | — | — | 60 | 525 | >600 |
| Injection molded specimen, after 1 wk. in 1% detergent at 140°F. | — | — | 50 | 560+ | >600 |
| Melt index, 230° C., 5 kg | 0.9 | 1.4 | 1.2 | 1.0 | 1.6 |
| Izod impact, R. T., GE/DE, ft.-lbs./in. | 8.5/3.0 | 8.0/3.0 | 7.7/3.4 | 8.7/3.0 | 9.4/3.1 |
| Tensile yield strength, psi | 6390 | 6270 | 6420 | 6490 | 6580 |
| Tensile fail strength, psi | 5390 | 5310 | 5450 | 5420 | 5460 |
| Elongation at failure, % | 30.3 | 27.5 | 30 | 25 | 24 |
| Rockwell "R" hardness | 105.9 | 103.5 | 104 | 104 | 104 |
| Heat deflection temp., °C. | 98.0 | 08.0 | 99.3 | 99.8 | 99.0 |

* on dry basis.
Note: 1
Time limit of test – 10 minutes (600 seconds)
>600 indicates no failure after 600 seconds.

The symbol "—" in the foregoing Table indicates that values in question were not observed.

The data show that samples containing polyvinyl acetate show surprisingly enhanced environmental stress crack resistance as compared to the control samples containing ABS polymer alone. The data also show that the other important physical properties of ABS are not adversely affected by the blend of the present invention.

EXAMPLES 10–17

In the following examples, ABS blends were prepared using Polymer B and Polymer C defined in Examples 1–9 together with various vinyl acetate homopolymers and copolymers identified in Table II below:

TABLE II

| GELVA[5] | VINAC[6] | POLY-TEX[1] | WT.AVG. MOL.WT. | MOLAR VISCOSITY, CPS[3] |
|---|---|---|---|---|
| V-7 | B-7 | — | 45,000 | 7 |
| V-15 | B-15 | — | 90,000 | 15 |
| C-3-V-20[2] | — | — | 115,000 | 20 |
| V-25 | B-25 | — | 140,000 | 25 |
| — | B-40 | — | 215,000 | 40 |
| V-100 | B-100 | 668 | 500,000 | 100 |
| — | B-400 | — | 1,150,000 | 400 |
| V-800 | B-800 | — | 1,500,000 | 800 |
| GP-702 | — | — | [4] | — |

Notes:
1. 65% solids content poly vinyl acetate emulsion available from Celanese Chemical Co.
2. Copolymer of vinyl acetate and 3% by wt. acrylic acid.
3. Viscosity of a solution of 86 g polymer per liter of solution. The values given have a range of ±10%.
4. GP-702 is a highly cross-linked, spray dried poly vinyl acetate.
5. Available from Monsanto Co.
6. Available from Air Products and Chemicals, Inc.

The results obtained are summarized in Table III below:

The surprising increase in stress crack resistance is especially noted within the preferred range of vinyl ac-

TABLE III

STRESS CRACK RESISTANT ABS: VINYL ACETATE POLYMER BLENDS

| Example | Control | Control | 10 | 11 | 12 | 13 | 14 | 15 | 16 | 17 |
|---|---|---|---|---|---|---|---|---|---|---|
| Composition,% | | | | | | | | | | |
| Polymer B | 65.0 | 65.3 | 62.0 | 62.0 | 62.0 | 62.0 | 62.0 | 62.0 | 62.0 | 62.0 |
| Polymer C | 30.0 | 29.5 | 28.0 | 28.0 | 28.0 | 28.0 | 28.0 | 28.0 | 28.0 | 28.0 |
| Rubber Conc.[2],Bale | 5.0 | 5.2 | 5.0 | 5.0 | 5.0 | 5.0 | 5.0 | 5.0 | 5.0 | 5.0 |
| Gelva V-800 | - | - | 5.0[1] | - | - | - | - | - | - | - |
| Vinac B-400 | - | - | - | 5.0 | - | - | - | - | - | - |
| Gelva V-100 | - | - | - | - | 5.0 | - | - | - | - | - |
| Vinac B-100 | - | - | - | - | - | 5.0 | - | - | - | - |
| Vinac B-40 | - | - | - | - | - | - | 5.0 | - | - | - |
| Gelva C-3-V-20 | - | - | - | - | - | - | - | 5.0 | - | - |
| Gelva V-7 | - | - | - | - | - | - | - | - | 5.0 | - |
| Gelva GP-702 | - | - | - | - | - | - | - | - | - | 5.0 |
| BHT,phr | 0.2 | 0.2 | 0.2 | 0.2 | 0.2 | 0.2 | 0.2 | 0.2 | 0.2 | 0.2 |
| Calcium Stearate, phr | 0.25 | 0.25 | 0.25 | 0.25 | 0.25 | 0.25 | 0.25 | 0.25 | 0.25 | 0.25 |
| Raven 1200 carbon black,phr | 0.25 | - | - | - | 0.25 | - | - | - | - | - |
| Properties | | | | | | | | | | |
| ESCR, sec. | 72 | 42 | >600[3] | >600 | >600 | >600 | >600 | >600 | 600 | 514 |
| MFR, 230°, 5kg | 1.4 | 1.2 | 1.1 | 0.9 | 1.4 | 1.1 | 1.3 | 1.4 | - | 1.2 |
| Izod Impact, R.T., GE/DE | -/3.9 | 8.8/4.4 | 9.1/3.6 | 9.6/4.7 | -/3.4 | 9.5/6.0 | 9.1/5.2 | 8.6/4.2 | - | 9.1/3.6 |
| Tensile Yld., psi | 5206 | 5350 | 5510 | 5250 | 5350 | 5350 | 5350 | 5100 | - | 5060 |
| Tensile Fail,psi | 5260 | 5190 | 5150 | 5080 | 5180 | 5230 | 5030 | 5160 | - | 5180 |
| Elong. at Fail,% | 50.7 | 44.2 | 41.4 | 39.8 | 48.9 | 48.1 | 42.0 | 47.8 | - | 49.3 |
| Rockwell "R" Hardness | 10B | 105.9 | 105.9 | 102.0 | 106 | 101.8 | 100.6 | 101.0 | - | 100.6 |

Notes:
1. PVAC introduced as 25% concentrate of Polymer B/Gelva V-800 (75/25)
2. Rubber concentrate, a styrene-acrylonitrile grafted polybutadiene containing 70% polybutadiene available from International Synthetic Rubber
3. Maximum Test period - 10 minutes (600 seconds)
   >600 indicates no failure after 600 seconds.

The above Table III clearly demonstrates the surprising increase in environmental stress crack resistance imparted to ABS composition by blending vinyl acetate polymers therewith in accordance with the present invention.

EXAMPLES 18–23

The following examples illustrate the effect of vinyl acetate polymer concentration on the environmental stress crack resistance imparted to the resulting ABS blend. The ABS and vinyl acetate polymers employed in these examples have been identified in Examples 1–17.

The results obtained are summarized in Table IV below:

etate concentration of 5 to 25 percent by weight. At 50% vinyl acetate polymer or higher, the resulting ABS composition becomes too brittle to mold.

Although specific materials and conditions were set forth in the above examples for making and using the improved ABS compositions of the present invention, these are merely intended as illustrations of the present invention. Various other ABS polymers, vinyl acetate polymers and copolymers, colorants, antioxidants, stabilizers, impact strength improvers, fillers and other additives conventionally added to resin compositions can be suitably employed with similar enhancement in stress crack resistance being obtained.

Other modifications of the present invention will

TABLE IV

EFFECT ON STRESS CRACK RESISTANCE OF VARYING VINYL ACETATE POLYMER CONCENTRATION IN ABS/VINYL ACETATE POLYMER BLENDS

| Example | Control | 18 | 19 | 20 | 21 | 22 | Control | 23 |
|---|---|---|---|---|---|---|---|---|
| Composition,% | | | | | | | | |
| Polymer B | 100.0 | 80.0 | 90.0 | 80.0 | 50.0 | 50.0 | 85.0 | 82.0 |
| Rubber Conc., Bale | — | — | — | — | — | — | 15.0 | 13.0 |
| Gelva V-800 | — | — | 10.0 | 20.0 | — | 50.0 | — | — |
| Vinac B-100 | — | — | — | — | — | — | — | 5.0 |
| Gelva Conc. [1] | — | — | — | — | 50.0 | — | — | — |
| Gelva Conc. [2] | — | 20.0 | — | — | — | — | — | — |
| BHT,phr | 0.2 | 0.2 | 0.2 | 0.2 | 0.2 | 0.2 | 0.2 | 0.2 |
| Calcium Stearate, phr | 0.25 | 0.25 | 0.25 | 0.25 | 0.25 | 0.25 | 0.25 | 0.25 |
| Raven 1200 carbon black,phr | — | — | — | — | — | — | 0.25 | 0.25 |
| Magnesium Oxide, phr | 0.05 | — | 0.05 | 0.05 | — | — | — | — |
| PVAc in compound,% | 0.0 | 5.0 | 10.0 | 20.0 | 25.0 | 50.0 | 0.0 | 5.0 |
| Properties | | | | | | | | |
| ESCR,sec. | <100 | >600 [4] | >600 | >600 | >600 | [3] | 53 | >600 |
| MFR, 230°, 5kg | 2.3 | 1.5 | 1.4 | 0.9 | 0.8 | do. | 0.9 | 1.0 |
| Izod Impact, R.T., GE/DE | 5.6/2.3 | 6.4/1.8 | 2.7/1.3 | 1.1/0.8 | 0.9/0.8 | do. | 10.9/7.7 | 10.0/6.9 |
| Tensile Yld., psi | 7230 | 7330 | 7340 | 7250 | 7260 | do. | 5080 | 5150 |
| Tensile Fail, psi | 5760 | 5990 | 5530 | 5210 | 5800 | do. | 4730 | 4760 |
| Elong. at Fail, % | 14.3 | 13.6 | 12.0 | 10.1 | 7.5 | do. | 38.6 | 37.2 |
| Rockwell "R" Hardness | 108.8 | 111.9 | 108.1 | 108.0 | 112.0 | do. | 95.8 | 97.8 |
| Heat Deflection Temp., °C | 102.0 | — | 103.3 | 101.8 | — | do. | — | — |

Notes:
1. Composition: Polymer B/PVAc: 50/50
2. Composition: Polymer B/PVAc: 75/25
3. Too brittle to mold
4. Maximum test period 10 minutes (600 seconds)

What is claimed is:

1. A polymeric molding composition with improved environmental stress crack resistance comprising an ABS type graft polymer formed by copolymerizing on a rubbery base material a mixture of (1) a monovinyl aromatic compound in which the vinyl group is attached directly to a carbon atom of the aromatic nucleus and (2) a non-aromatic vinyl or vinylidene monomer and, blended with said ABS type graft polymer, a vinyl acetate polymer at least 50% of which by weight represents vinyl acetate, the amount of said vinyl acetate polymer being at least 0.5% but less than 50% of the weight of it and said ABS type graft copolymer combined.

2. A polymeric molding composition as defined in claim 1 wherein said rubbery base material comprises from about 2 to about 30% by weight of said ABS type graft polymer and the weight proportion of (1)/(2) is from about 60/40 to about 80/20.

3. A polymeric molding composition as defined in claim 1 wherein said rubbery base material is derived mostly from butadiene, said monovinyl aromatic compound is essentially styrene and said non-aromatic vinyl or vinylidene monomer is essentially acrylonitrile.

4. A polymeric molding composition as defined in claim 1 wherein said vinyl acetate polymer constitutes from about 5 to about 25% of the weight of it and said ABS type graft copolymer combined.

5. A polymeric molding composition as defined in claim 4 wherein said vinyl acetate polymer is formed predominantly from vinyl acetate, the rubber base material is derived mostly from butadiene and constitutes from about 4 to 15% by weight of said ABS type graft polymer, the monovinyl aromatic compound is essentially styrene, the non-aromatic monomer is essentially acrylonitrile and the weight proportion of styrene/acrylonitrile is from about 74/26 to about 60/40.

6. A method for improving the environmental stress crack resistance of an ABS type graft polymer formed by copolymerizing on a rubbery base material a mixture of (1) a monovinyl aromatic compound having the vinyl group directly attached to the aromatic nucleus and (2) a non-aromatic vinyl or vinylidene monomer which comprises incorporating in said ABS type graft polymer a vinyl acetate polymer at least 50% by weight of which represents vinyl acetate to the extent of about 0.5% to below 50% by weight of the two polymers combined.

7. A method for improving the environmental stress crack resistance of a grafted ABS type polymer of acrylonitrile and styrene on a butadiene rubber base material which comprises incorporating into said grafted ABS type polymer a vinyl acetate polymer at least 50% by weight of which represents vinyl acetate to the extent of about 0.5% to below 50% of the combined weight of said grafted ABS type polymer plus said vinyl acetate polymer.

8. A method as defined in claim 7 wherein said vinyl acetate polymer amounts to from about 5 to about 25% of said combined weight.

9. A method as defined in claim 7 wherein said vinyl acetate polymer is polyvinyl acetate.

10. A method as defined in claim 7 wherein said vinyl acetate polymer is a copolymer of vinyl acetate and a copolymerizable monomer.

* * * * *